(12) United States Patent
Boden et al.

(10) Patent No.: US 9,099,104 B2
(45) Date of Patent: *Aug. 4, 2015

(54) STACKED FILM REFLECTIVE LAYERS FOR MULTI-LAYER OPTICAL DATA STORAGE

(71) Applicant: General Electric Company, Schenectady, NY (US)

(72) Inventors: Eugene Pauling Boden, Scotia, NY (US); Xiaolei Shi, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/543,438

(22) Filed: Nov. 17, 2014

(65) Prior Publication Data

US 2015/0071046 A1 Mar. 12, 2015

Related U.S. Application Data

(63) Continuation of application No. 13/708,107, filed on Dec. 7, 2012, now Pat. No. 8,889,241.

(51) Int. Cl.
*G11B 7/24* (2013.01)
*G11B 7/24044* (2013.01)
*G11B 7/24067* (2013.01)
*G11B 7/0065* (2006.01)
*G11B 7/24038* (2013.01)
*G11B 7/248* (2006.01)
*G11B 7/249* (2013.01)
(Continued)

(52) U.S. Cl.
CPC .......... *G11B 7/24044* (2013.01); *G11B 7/0065* (2013.01); *G11B 7/248* (2013.01); *G11B 7/249* (2013.01); *G11B 7/24038* (2013.01); *G11B 7/24041* (2013.01); *G11B 7/24067* (2013.01); *G11B 7/26* (2013.01); *G11B 2007/00656* (2013.01); *Y10T 156/10* (2015.01); *Y10T 428/21* (2015.01); *Y10T 428/2495* (2015.01); *Y10T 428/24942* (2015.01)

(58) Field of Classification Search
CPC ......... G11B 7/244; G11B 7/246; G11B 7/248
See application file for complete search history.

(56) References Cited

U.S. PATENT DOCUMENTS

| 4,864,537 A | 9/1989 | Michl et al. |
| 5,088,088 A | 2/1992 | Clark |
| 6,322,931 B1 | 11/2001 | Cumpston et al. |

(Continued)

FOREIGN PATENT DOCUMENTS

CN 102054496 B 9/2012

OTHER PUBLICATIONS

PCT Search Report and Written Opinion dated Mar. 27, 2014 issued in connection with corresponding PCT Application No. PCT/US2013/071362.

*Primary Examiner* — Elizabeth Mulvaney
(74) *Attorney, Agent, or Firm* — Jean K. Testa; Fletcher Yoder, P.C.

(57) ABSTRACT

A component comprising a stacked interleaved film structure that includes a plurality of layers inert to light. Alternating layers are either doped with a reverse saturable absorber (RSA) material or the RSA material is located between the adjacent inert layers. In some embodiments, the inert alternating layers have different refractive indices. A data storage device and methods of manufacture are also disclosed.

28 Claims, 7 Drawing Sheets

(51) Int. Cl.
    *G11B 7/24041* (2013.01)
    *G11B 7/26* (2006.01)

(56) References Cited

U.S. PATENT DOCUMENTS

| | | | |
|---|---|---|---|
| 6,737,154 B2 | 5/2004 | Jonza et al. | |
| 7,388,695 B2 | 6/2008 | Lawrence et al. | |
| 8,144,744 B2 | 3/2012 | Singer et al. | |
| 8,524,348 B1 | 9/2013 | Shi et al. | |
| 2005/0136333 A1 | 6/2005 | Lawrence et al. | |
| 2006/0087948 A1 | 4/2006 | Balistreri et al. | |
| 2010/0047508 A1 | 2/2010 | Wisnudel | |
| 2011/0103211 A1 | 5/2011 | Fujita et al. | |
| 2011/0249325 A1 | 10/2011 | Zehentmaier et al. | |
| 2011/0249334 A1 | 10/2011 | Merrill et al. | |
| 2012/0147724 A1 | 6/2012 | Natarajan et al. | |
| 2014/0036328 A1 | 2/2014 | Shi et al. | |

STACKED FILM REFLECTIVE LAYERS FOR MULTI-LAYER OPTICAL DATA STORAGE

CROSS-REFERENCE TO RELATED APPLICATIONS

The present application is a continuation application of U.S. Pat. No. 8,889,241 entitled "STACKED FILM REFLECTIVE LAYERS FOR MULTI-LAYER OPTICAL DATA STORAGE," filed on Dec. 7, 2012. The present application is also related in part both to commonly assigned, U.S. Pat. No. 8,524,348 entitled "STACKED FILM OPTICAL DATA STORAGE DEVICE AND METHOD OF MANUFACTURE," issued on Sep. 3, 2013, and U.S. Pat. No. 8,830,548 entitled STACKED FILM THRESHOLD COMPONENT, DEVICE, AND METHOD OF MANUFACTURE issued on Sep. 9, 2014, all of which is incorporated by reference herein for all purposes.

BACKGROUND OF THE INVENTION

The present invention relates generally to stacked film components, devices that employ the components, methods of manufacturing the devices and/or the components, and, in particular embodiments, methods of recording and/or reading holograms on a device that incorporates aspects of the present invention.

Micro-holographic data storage enables large numbers of data layers in a single disc to achieve high data capacity. In each of the data layers, digital data "0" or "1" is represented by a presence or absence of a micro-hologram. The micro-hologram functions as a local reflector upon readout beam illumination. Presence or absence of a micro-hologram provides a "high" or "low" reflected signal that provides stored information.

Optical recording of a micro-hologram requires two counter-propagating focused coherent laser beams from both sides of the disc with overlapping focal regions. Interference of the two beams at the focal region induces local changes of the material that results in a refractive index modulation pattern, which is the micro-hologram. Good alignment of these two beams typically requires a five-axis servo system during dynamic recording. In addition, recording at all the layers through the depth of the disc requires a well aberration compensated optical system, which is very challenging at high numerical aperture. Therefore, both the optics and servo system are much more complicated and expensive than what are required in conventional optical drive systems where only a single focused beams is used for recording and/or readout.

The concept of "pre-format" was proposed to overcome this issue. (See e.g., U.S. Pat. No. 7,388,695). In this scheme, blank discs are "pre-formatted" with the micro-hologram layers before being used in an optical drive. This "pre-format" step is one of the steps in disc manufacturing. The preformatted discs are then used in an optical drive for recording and readout. The recording is done through erasure or modification of the micro-holograms using a single focused laser beam. The system for "pre-formatting" is a high quality expensive dual-side micro-hologram recording system.

Accordingly, there is an ongoing opportunity for improving upon existing optical data storage structures, methods of manufacture, methods of recording, and/or methods for reading.

BRIEF DESCRIPTION

The present invention overcomes at least some of the aforementioned drawbacks by eliminating the need to optically pre-format data storage devices. More specifically, the present invention is directed to providing a stacked film component, device, and methods of manufacture, recording, and/or reading that instead of using threshold material(s) only requires the use of commercial available polymers and Reverse Saturable Absorber (RSA) dyes.

Therefore, in accordance with one aspect of the invention, a component comprises a stacked film structure comprising a plurality of layers inert to light having a first refractive index interleaved with a plurality of layers inert to light having a second refractive index, wherein in the first refractive index is different than the second refractive index; and a plurality of layers comprising a reverse saturable absorber (RSA) material, wherein each of the plurality of layers is located between one of the plurality of layers inert to light having the first refractive index and one of the plurality of layers inert to light having the second refractive index.

In accordance with another aspect of the invention, a method of manufacture comprises method of manufacture comprises: providing a plurality of layers inert to light having a first refractive index; providing a plurality of layers inert to light having a second refractive index, wherein the first refractive index is different than the second refractive index; applying a reverse saturable absorber (RSA) material to at least one of the layer inert to light having the first refractive index and the layer inert to light having the second refractive index; and, adhering the plurality of layers inert to light having the first refractive index to the plurality of layers inert to light having the second refractive index, so that the plurality of layers inert to light having the first refractive index and the plurality of layers inert to light having the second refractive index are interleaved, thereby forming a component having the RSA material located between the layer inert to light having the first refractive index and the layer inert to light having the second refractive index.

In accordance with another aspect of the invention, a component comprises: a stacked film structure comprising a plurality of first layers inert to light interleaved with a plurality of second layers inert to light, further wherein the plurality of second layers are doped with a reverse saturable absorber (RSA) material.

In accordance with another aspect of the invention, a method of manufacture comprises: providing a plurality of layers inert to light having a first refractive index; providing a plurality of layers inert to light having a second refractive index, said plurality of layers having the second refractive index further including a reverse saturable absorber (RSA) material doped therein; and, adhering the plurality of layers inert to light having the first refractive index to the plurality of layers inert to light having the second refractive index, so that the plurality of layers inert to light having the first refractive index and the plurality of layers inert to light having the second refractive index are interleaved, thereby forming a stacked component having the doped RSA material-laden layers located between the layer inert to light having the first refractive index.

Various other features and advantages of the present invention will be made apparent from the following detailed description and the drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
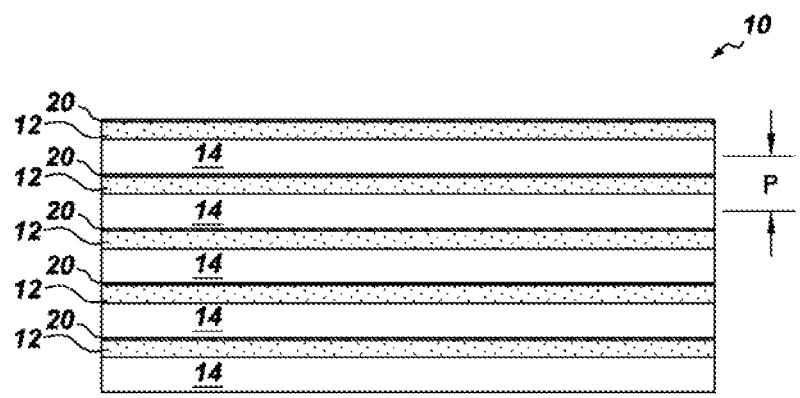
FIG. 1 is a sectional elevation view of a portion of a stacked film component, according to an embodiment of the present invention.

Unless defined otherwise, technical and scientific terms used herein have the same meaning as is commonly understood by one of ordinary skill in the art with respect to the presently disclosed subject matter. The terms "first", "second", and the like, as used herein do not denote any order, quantity, or importance, but rather are used to distinguish one element from another. The terms "a", "an", and "the" do not denote a limitation of quantity, but rather denote the presence of at least one of the referenced item, and the terms "front", "back", "bottom", and/or "top", unless otherwise noted, are used for convenience of description only, and are not limited to any one position or spatial orientation.

If ranges are disclosed, the endpoints of all ranges directed to the same component or property are inclusive and independently combinable (e.g., ranges of "up to about 25 wt. %" is inclusive of the endpoints and all intermediate values of the ranges of "about 5 wt. % to about 25 wt. %," etc.). The modified "about" used in connection with a quantity is inclusive of the stated value and has the meaning dictated by the context (e.g., includes the degree of error associated with measurement of the particular quantity). Accordingly, the value modified by the term "about" is not necessarily limited only to the precise value specified.

As used herein, the term "non-linear sensitizer" refers to a material that has a sensitivity having dependence to the light intensity, that is, the sensitivity is high at the higher (recording) intensity and low at the lower (readout) intensity.

As used herein, the term "sensitivity" is defined as the amount of index change obtained with respect to the amount of fluence used to irradiate a spot of the film with the laser light. In general, sensitivity for linear materials and/or linear sensitizers does not change over a variety of intensities.

As used herein, the term "fluence" means the amount of optical beam energy that has traversed a unit area of the beam cross-section (measure, for example, in Joule/$cm^2$), while the term "intensity" means optical radiative flux density, e.g., amount of energy traversing a unit area of beam cross-section in unit time (measure in, for example, Watt/$cm^2$).

As used herein, the term "no change" in reference to change in a refractive index is meant to include a material or combination of materials that have change of less than about 0.05% change in its refractive index over a duration of time.

The term "adjoining" as used herein means either the two, or more, elements are in physical contact with each other or there may be an interstitial layer(s) therebetween the two, or more, elements. That is the two, or more, elements are joined in some fashion so as to result in a single construct.

The term "high intensity" as used herein includes light in a range from about 50 MW/$cm^2$ to about 500 MW/$cm^2$. The term "low intensity" as used herein includes light in a range from 0.1 MW/$cm^2$ to about 30 MW/$cm^2$.

Referring to the figures, FIG. 1 depicts a sectional elevation view of a stacked film structure, or structure, 10, according to an embodiment of the present invention. Aspects of the present invention provide for the use of commercially available polymers and reverse saturable absorber (RSA) material(s). That is aspects of the present invention are such that no threshold materials are required. The structure 10 comprises a plurality of layers inert to light having a first refractive index 12. The structure 10 further comprises a plurality of layers inert to light having a second refractive index 14. The first refractive index and the second refractive index of the layers 12, 14 are different. As shown, the plurality of layers inert to light having a first refractive index 12 and the plurality of layers inert to light having a second refractive index 14 are configured such that they are interleaved, or alternating, within the structure 10.

As shown, between the plurality of layers inert to light having a first refractive index 12 and the plurality of layers inert to light having a second refractive index 14 is a layer 20, wherein the layer 20 comprises a reverse saturable absorber (RSA) material. The layer, or RSA layer, 20 may be placed either on the plurality of layers inert to light having a first refractive index 12 and/or on the plurality of layers inert to light having a second refractive index 14. In any event, the ultimate structure 10 comprises a laminar structure wherein the RSA layer 20 is ultimately located between the plurality of layers inert to light having a first refractive index 12 and the plurality of layers inert to light having a second refractive index 14.

Various suitable RSA materials may be used for the RSA layer 20. In particular embodiments, the RSA material used is sensitive to light having a wavelength in a range from about 300 nm to about 800 nm. In another particular embodiment, the RSA material used is sensitive to light having a wavelength in a range from about 380 nm to about 420 nm.

Suitable RSA dyes include, without limitation, for example a photochemically stable and thermally stable dye, such as a metal phthalocyanine dye, such as Irgaphor Ultragreen Mx (commercially available from Ciba), copper phthalocyanine, lead phthalocyanine, zinc phthalocyanine, indium phthalocyanine, indium tetra-butyl phthalocyanine, gallium phthalocyanine, cobalt phthalocyanine, platinum phthalocyanine, nickel phthalocyanine, tetra-4-sufonatophenylporphyrinato-copper(II) or tetra-4-sulfonatophenylporphyrinato-zinc(II). Suitable lasers known to excite these various "green" RSA dyes include green lasers (e.g., 532 nm). These various green RSA dyes are disclosed in U.S. patent application Ser. No. 11/376,545, now issued as U.S. Pat. No. 7,388,695, and incorporated herein by reference in its entirety for any and all purposes, so long as not directly contradictory with the teachings herein.

Other suitable RSA dyes include "blue" RSA dyes that are capable of undergoing photoexcitation upon impingement with incident actinic radiation at a wavelength of, for example, 405 nm. Several suitable RSA dyes are disclosed in U.S. Pat. No. 8,182,967 and U.S. patent application Ser. No. 12/551,455 and incorporated herein by reference in their entirety for any and all purposes, so long as not directly contradictory with the teachings herein. These blue RSA dyes generally include subphthalocyanines and platinum ethynyl based dyes. Specific examples include, but are limited to, 3,5-dibromophenoxysubphthalocyaninato]boron(III), 3-iodophenoxysubphthalocyaninato]boron(III), trans-Bis(tributylphophine)bis(4-ethynylbiphenyl)platinum (PPE), trans-Bis(tributylphosphine)bis(4-ethynyl-1-(2-phenyllethynyl)benzene)platinum (PE2).

Additional suitable RSA dyes for use as the RSA layer 20 include the class of compounds of porphyrins, and the like.

The plurality of layers inert to light having a first refractive index 12 and the plurality of layers inert to light having a second refractive index 14 may comprise any suitable material or combinations of materials that are inert to light or about inert to light. Examples of suitable materials for the layers 12, 14 include, but are not limited to, poly(alkyl methacrylates), such as poly(methyl methacrylate) (PMMA), polyvinyl alcohols, poly(alkyl acrylates), polystyrenes, polycarbonates, poly(vinylidene chloride), poly(vinyl acetate), combinations thereof, and the like. Other examples of suitable materials for the layers 12, 14 include poly(vinylidene fluoride-co-trifluoroethylene) PVDF, poly(vinylpyrrolidone) PVP, or various compositions of styrene-acrylonitrile SAN.

It should be noted that while FIG. 1 depicts a particular embodiment of the structure 10, other configurations are available, without departing from the present invention. For example, the RSA layers 20, in addition to being located at the interfaces between the layers 12 and 14, as shown in FIG. 1, may additionally be located at the interfaces between layers 14 and 12 (not shown in FIG. 1). For illustrative purposes only, one can assign the layer having a first refractive index 12 an "A"; assign the layer having a second refractive index 14 a "B"; and, assign the RSA layer 20 a "C". As such, under aspects of the present invention, various possible embodiments of the combination or order of layers 12, 14 and RSA layer 20 include A-C-B-C-A-C-B-C-A; or, in another embodiment A-C-B-A-C-B-A-C-B-A; or, B-C-A-B-C-A-B-C-A-B; or, A-B-A-C-B-A-B-C-A-B-A-C, and the like.

The thickness of the plurality of layers inert to light having a first refractive index 12 and the plurality of layers inert to light having a second refractive index 14 may be the same in certain embodiments. In other embodiments, the thickness of the plurality of layers inert to light having a first refractive index 12 and the plurality of layers inert to light having a second refractive index 14 may be different. A thickness of each of the plurality of layers inert to light 12, 14 may be, for example, in a range from about 20 nm to about 500 nm. The layer of RSA material 20 is typically negligible as compared to the thicknesses of the other plurality of layers inert to light 12, 14. The layer of RSA material 20 may be, for example, less than about 5 nm in thickness.

Further, while FIG. 1 shows quantities of five and four, respectively, of the layers inert to light having a first refractive index 12 and the layers inert to light having a second refractive index 14, other quantities are available without departing from the intent of the present invention. For example, the layers inert to light having a first refractive index 12 and the layers inert to light having a second refractive index 14 may be virtually any quantity including, for example, between two layers up to about fifty layers interleaved in the structure 10.

Referring back to FIG. 1, P, is shown as a period of the structure 10 as is defined in Equation 1 as:

$$P = \lambda/2n \qquad \text{Eq. 1}$$

Wherein n is $n_{effective}$ of the structure 10. The layers 12 having a first refractive index, $n_1$ and a thickness, $d_1$. Similarly, the layers 14 having a second refractive index, $n_2$ and a thickness, $d_2$. In this manner, the components (e.g., 12, 14) of structure 10 are configured such that Equation 2 is met:

$$n_1 d_1 + n_2 d_2 = \lambda/2 \qquad \text{Eq. 2}$$

In this manner, the stacked structure 10 is periodic in its arrangement. Depending on the particular materials employed and their respective refractive indices, different thicknesses of the materials are warranted.

Figure 2:
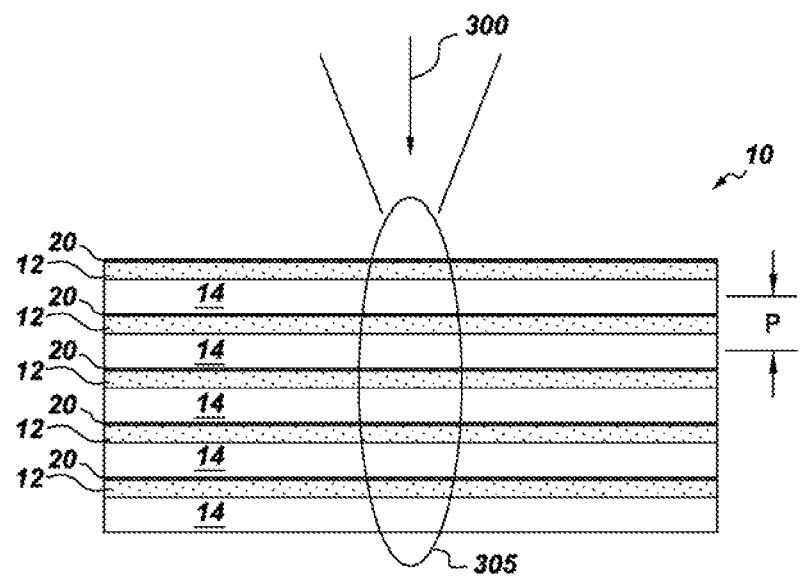
FIGS. 2 and 3 are sectional elevation views of a portion of the stacked film component of FIG. 1 undergoing recording and reading, respectively, according to an embodiment of the present invention.
Figure 3:
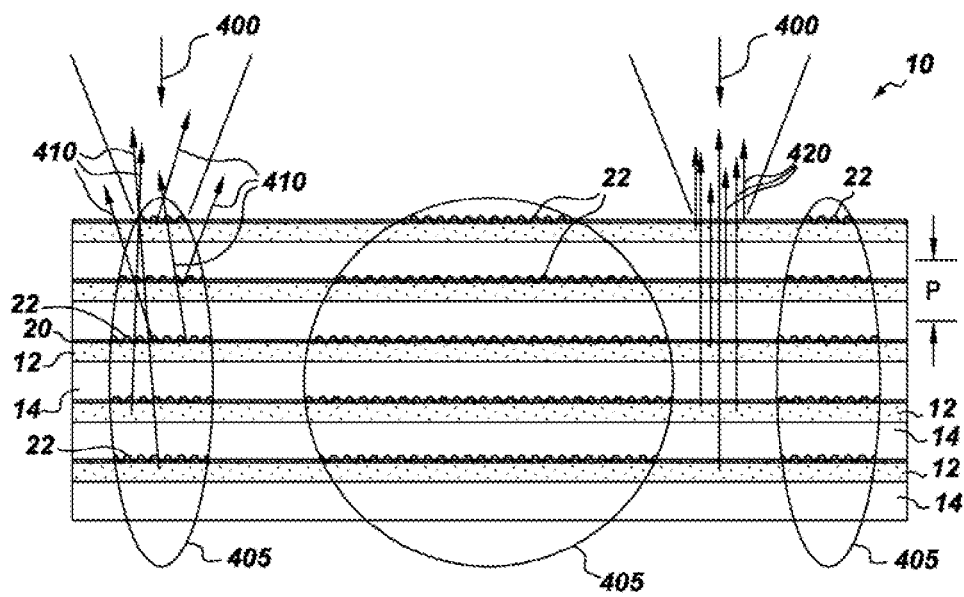

Referring to FIGS. 2 and 3, sequential elevation sectional views of the embodiment from FIG. 1 undergoing a recording beam and reading beam, respectively, is shown. In FIG. 2, the component 10 receives a focused recording laser beam 300 such that the beam 300 impinges at 305 on a portion of the component 10. As a result of the application of the focused recording laser beam 300, portions 405 of the component 10 are thereby modified as depicted in FIG. 3. As shown schematically in FIG. 3, portions 22 of the RSA material 20 are modified as a result. Depending on what RSA material(s) are used, a suitable focused recording beam 300 is selected that provides the proper modification of the RSA material(s) 20 to the modified version 22. Applications of the recording beam 300 on the RSA material causes the RSA material to heat and produce distortions thereby causing disruption the interface effect. As shown in FIG. 3, a focused reading laser beam 400 may be applied to the component 10. As depicted, depending on whether the focused reading laser beam 400 is applied to portions 405 that received the focused recording beam 300 (FIG. 2), the reflected light from the component 10 will respond differently. As shown on the left portion of FIG. 3, the reflected light 410 is scattered due to the application of the reading beam 400 on portions 405 that have been modified and no significant signal is returned to the detector (i.e., digital "0"). Contrastingly, the right portion of FIG. 3, the reflected light 420 has little or no scatter due to the application of the reading beam 400 on portions of the component 10 that have not been modified by a recording beam 300 and the detector receives the reflected signal (i.e., digital "1").

Figure 4:
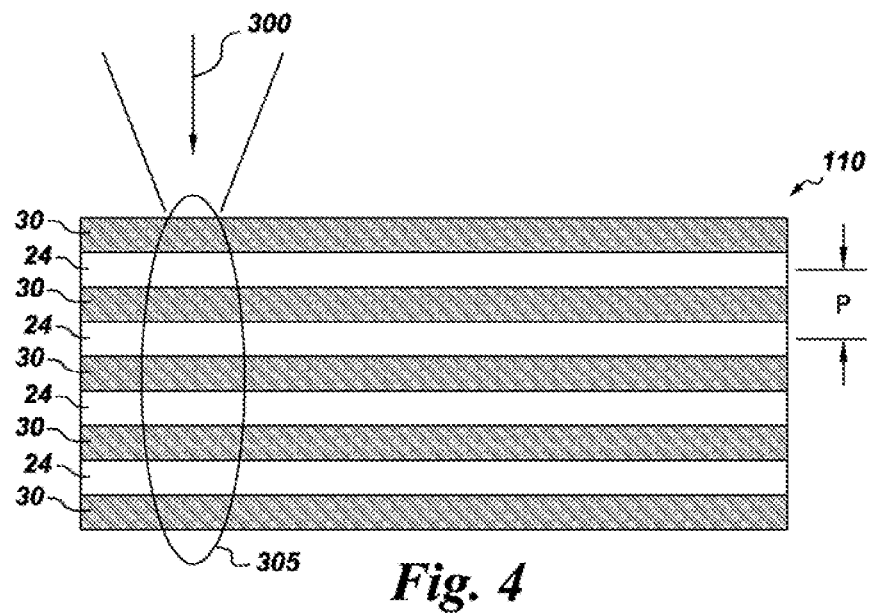
FIGS. 4 and 5 are sectional elevation views of a portion of a stacked film component undergoing recording and reading, respectively, according to another embodiment of the present invention.

Referring to FIG. 4, a sectional elevation view of a stacked film structure, or structure, 110, according to an embodiment of the present invention, is depicted. The structure 110 comprises a plurality of layers inert to light having a first refractive index 24. The structure 110 further comprises a plurality of layers inert to light having a second refractive index 30. The first refractive index and the second refractive index of the layers 24, 30 are different. As shown, the plurality of layers inert to light having a first refractive index 24 and the plurality of layers inert to light having a second refractive index 30 are configured such that they are interleaved, or alternating, within the structure 110.

As shown, the plurality of layers inert to light having a second refractive index 30 is doped with a reverse saturable absorber (RSA) material. Suitable RSA materials for use as the dopant are discussed elsewhere herein. Similarly, suitable materials for layers 24, 30 are elsewhere discussed with regards to layers 12, 14.

Figure 5:
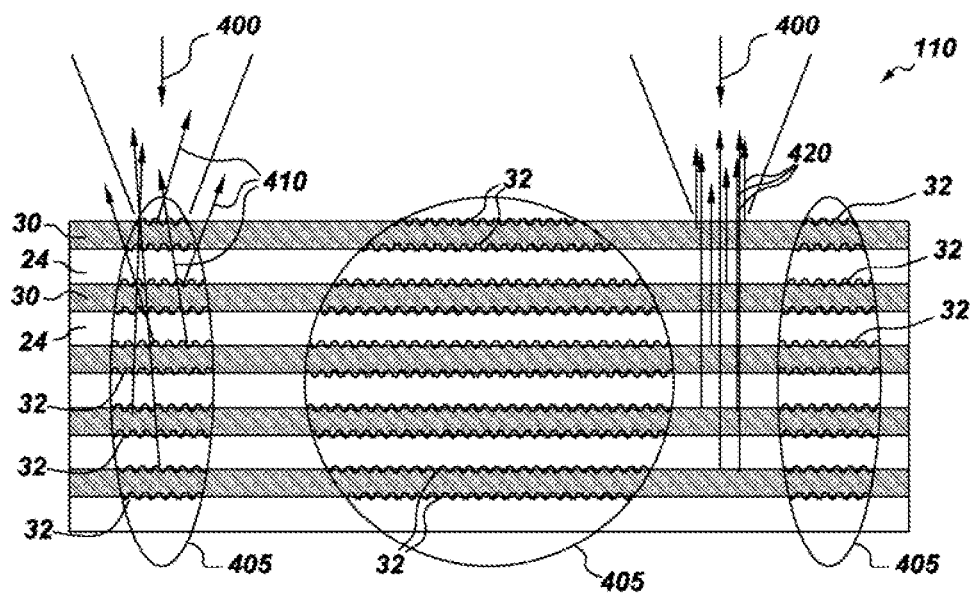

As shown in FIG. 4, the component 110 receives a focused recording laser beam 300 such that the beam 300 impinges at 305 on a portion of the component 110. As a result of the application of the focused recording laser beam 300, portions 405 of the component 110 are thereby modified as depicted in FIG. 5. As shown schematically in FIG. 5, portions 32 of the doped second layer 30 are modified as a result. Depending on what RSA material(s) are doped in the layer 30, a suitable focused recording beam 300 is selected that provides the proper modification of the material(s) second layer 30 to the modified version 22. Applications of the recording beam 300 on the RSA material causes the RSA material to heat and produce distortions thereby causing disruption the interface effect. As shown in FIG. 5, a focused reading laser beam 400 may be applied to the component 110. As depicted, depending on whether the focused reading laser beam 400 is applied to portions 405 that received the focused recording beam 300 (FIG. 4), the reflected light from the component 10 will respond differently. As shown on the left portion of FIG. 5, the reflected light 410 is scattered due to the application of the reading beam 400 on portions 405 that have been modified. Contrastingly, the right portion of FIG. 5, the reflected light 420 has little or no scatter due to the application of the reading beam 400 on portions of the component 110 that have not been modified by a recording beam 300.

Figure 6:
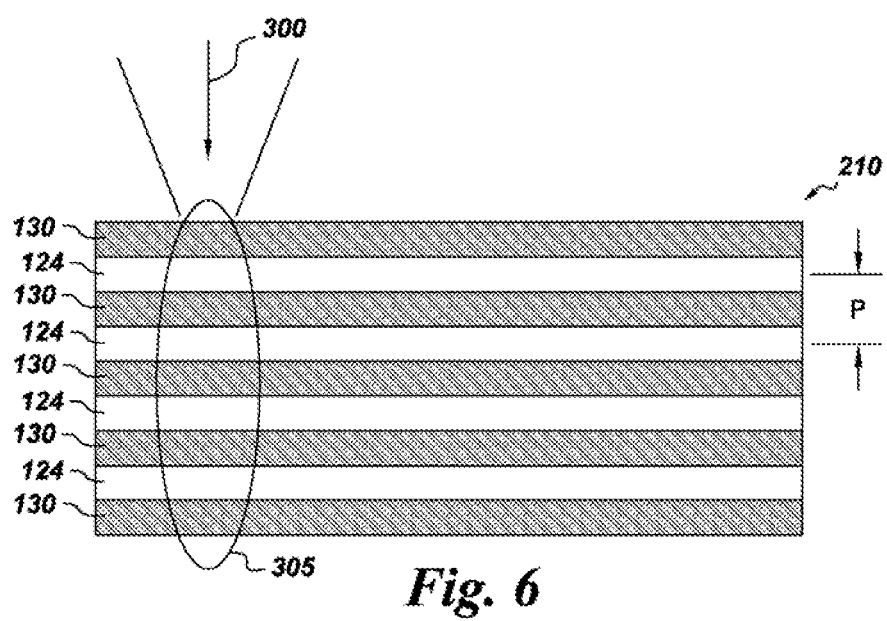
FIGS. 6 and 7 are sectional elevation views of a portion of a stacked film component undergoing recording and reading, respectively, according to another embodiment of the present invention.

Referring collectively to FIGS. 6-9, other stacked components 210, 310 of the present invention are depicted. As shown in FIG. 6, the component 210 comprise a stacked film structure that comprises a plurality of first layers inert to light 124 interleaved with a plurality of second layers inert to light 130. The plurality of second layers inert to light 130 may comprise a block copolymer. The plurality of first layers inert to light 124 may also comprise a block copolymer, in an embodiment. The plurality of second layers inert to light 130 are further doped with a reverse saturable absorber (RSA) material. Suitable RSA materials are discussed elsewhere herein. Similarly, suitable materials for layers 124, 130 are elsewhere discussed with regards to layers 12, 14, 24, 30.

In an embodiment, there may be nano-sized polyethylene oxide (PEO) crystals scattered uniformly through a polystyrene (PS) matrix that comprises the plurality of second layers inert to light 130. The particles may be small enough (e.g., <25 nm) so as to prevent scattering of light. However, in the crystalline phase they increase their refractive index of the PEO/PS volume. When an RSA dye absorbs energy at the focal points, it rapidly dissipates heat and melts the crystals in that region. The then amorphous PEO in the PS causes the refractive index to decrease in that region. As a result, a characteristic fringe of varying refractive indices (i.e., hologram) is produced. In this manner, the RSA dyes used in the plurality of second layers inert to light 130 act as thermal heaters within the block copolymers so that the block copolymers experience a phase transition.

As shown in FIG. 6, a focused recording laser beam 300 is applied to portions 305 of the structure 210. Depending on the particular embodiment used and the relative reflective indices of the layers 124, 130 and the particular RSA materials used, the application of the beam 300 on the doped layer 130 will change the refractive index of the layer 130 so that the refractive indices of the layers 124, 130 are the same, or similar, and thereby upon readout the applied light passes through the transparent regions 405 of the component 210 (see FIG. 7) and is not returned to the detector. The portions 305 having had changes in the refractive index comprise hologram 405.

Figure 7:
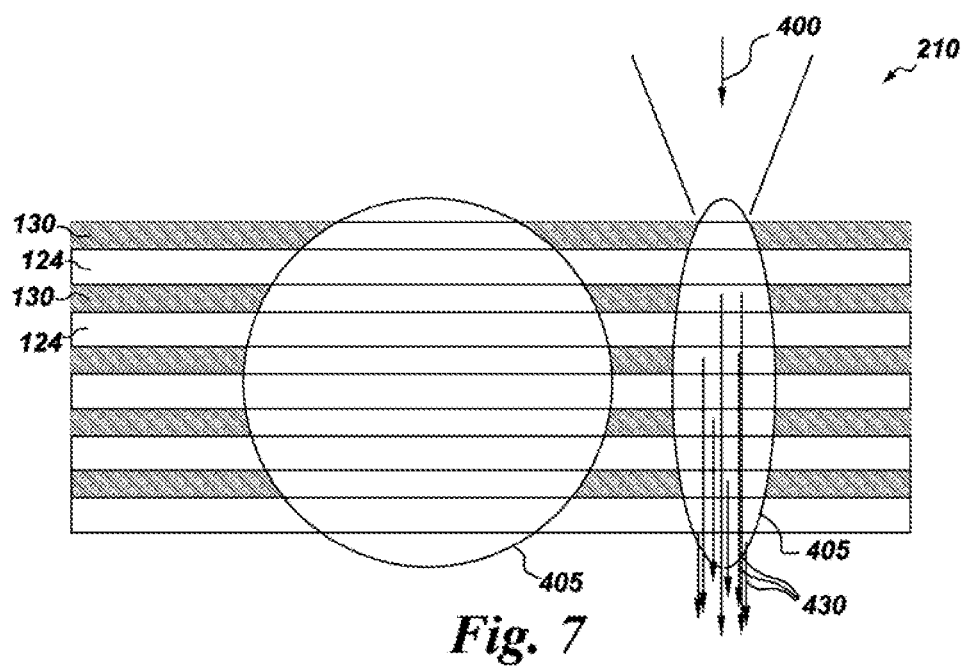

Referring to FIG. 7, a focused reading laser beam 400 may be applied to the component 210 that has had holograms 405 recorded thereon. As depicted, depending on whether the focused reading laser beam 400 is applied to the hologram portions 405 that received the focused recording beam 300 (FIG. 6), the applied light from the component 210 will respond differently. As shown on the right portion of FIG. 7, the applied light 430 has little, or no, scatter due to the application of the reading beam 400 on portions of the component 210 that have been modified by a recording beam 300. Due to the transparency of the component 210 in these portions 405, the light beam 400 passes through the component 210 and is not reflected.

Figure 8:
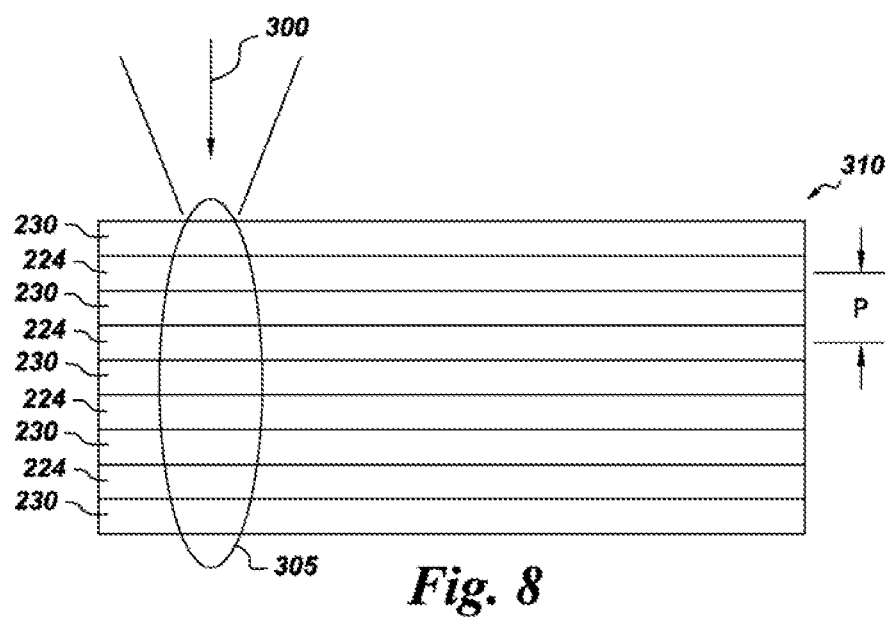
FIGS. 8 and 9 are sectional elevation views of a portion of a stacked film component undergoing recording and reading, respectively, according to another embodiment of the present invention.

As shown in FIG. 8, the component 310 comprise a stacked film structure that comprises a plurality of first layers inert to light 224 interleaved with a plurality of second layers inert to light 230. The plurality of second layers inert to light 230 may comprise a block copolymer. The plurality of first layers inert to light 224 may also comprise a block copolymer, in an embodiment. The plurality of second layers inert to light 230 are further doped with a reverse saturable absorber (RSA) material. Suitable RSA materials are discussed elsewhere herein. Similarly, suitable materials for layers 224, 230 are elsewhere discussed with regards to layers 12, 14, 24, 30, 124, 130.

In an embodiment, there may be nano-sized polyethylene oxide (PEO) crystals scattered uniformly through a polystyrene (PS) matrix that comprises the plurality of second layers inert to light 230. The particles may be small enough (e.g., <25 nm) so as to prevent scattering of light. However, in the crystalline phase they increase their refractive index of the PEO/PS volume. When an RSA dye absorbs energy at the focal points, it rapidly dissipates heat and melts the crystals in that region. The then amorphous PEO in the PS causes the refractive index to decrease in that region. As a result, a characteristic fringe of varying refractive indices (i.e., hologram) is produced. In this manner, the RSA dyes used in the plurality of second layers inert to light 230 act as thermal heaters within the block copolymers so that the block copolymers experience a phase transition.

As shown in FIG. 8, a focused recording laser beam 300 is applied to portions 305 of the structure 310. Depending on the particular embodiment used and the relative reflective indices of the layers 224, 230 and the particular RSA materials used, the refractive indices of the layers 224, 230 are the same, or similar. Upon the application of the beam 300 on the doped layer 230 will change the refractive index of the layer 230 so that the refractive indices of the layers 224, 230 end up being different than each other, and thereby upon readout the applied light 400 reflects directly back to the detector in the regions 405 of the component 420 (see FIG. 9). The portions 305 having had changes in the refractive index comprise hologram 405. The heating of the portions 305 in the embodiment is less severe and does not deform the interfaces as discussed before. Thus, there is no, or little, scatter of light although there is a change in reflective index.

Figure 9:
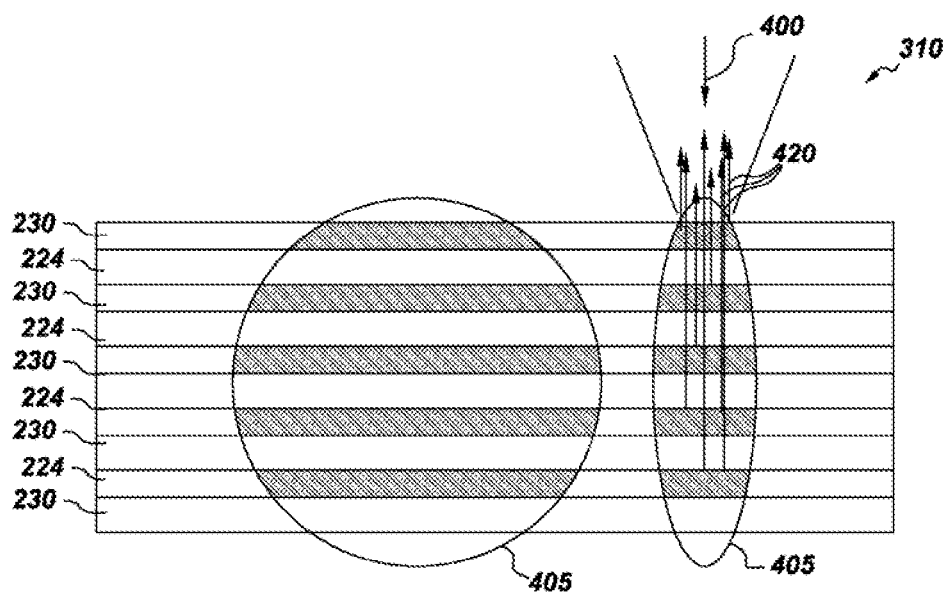

Referring to FIG. 9, a focused reading laser beam 400 may be applied to the component 310 that has had holograms 405 recorded thereon. As depicted, depending on whether the focused reading laser beam 400 is applied to the hologram portions 405 that received the focused recording beam 300 (FIG. 8), the applied light from the component 310 will respond differently. As shown in FIG. 9, the reflected light 420 has little, or no, scatter due to the application of the reading beam 400 on portions of the component 310 that have been modified by a recording beam 300. Due to the transparency of other regions (i.e., not the holograms 405) of the component 310, the light beam 400 may pass through the component 310 and is not reflected.

Figure 10:
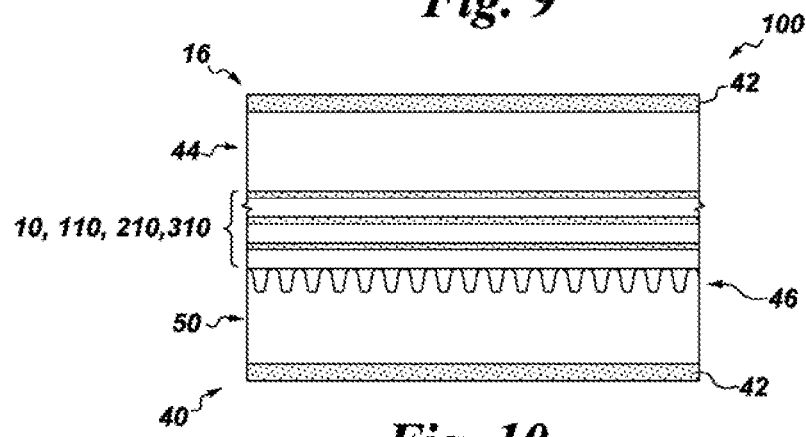
FIG. 10 is a sectional elevation view of a portion of a data storage device using a component, according to an embodiment of the present invention.

Referring to FIG. 10, a sectional elevation view of a portion of a data storage device, and data storage device component, according to an embodiment of the present invention, is shown. The data storage device, depicted as 100, includes a data storage device component 10, 110, 210, 310 and other elements.

The data storage device 100 comprises a substrate layer 44 with the data storage device component 10, 110, 210, 310 adjoined thereto. As shown adjoining a second side of the data storage device component 10, 110, 210, 310 may be a second substrate layer 50. The second substrate layer 50 may further include a servo layer 46 therein.

The data storage device 100 may further include a suitable barrier coating 42 on one, or both, sides of the device 100. Any suitable material may be used, now known or later developed, for the barrier coating 42. Further, the data storage device 100 may include one, or more, of an anti-scratch coating and an anti-reflection coating. Although the anti-scratch coating and/or the anti-reflection coating may be placed on both sides of the data storage device 100, typically these coatings are only applied on the upper side of the data storage device 100, as the upper side is the side from which read and/or writing actions are conducted on the data storage device 100.

As a result, the data storage device 100 of the present invention may ultimately be configured so as to function as a micro-holographic data storage device. In an embodiment the micro-holographic data storage device may comprise a disc. Suitable discs may include, but are not limited to, standard disc sizes, such as a disc having a total thickness of about 1.2 mm or about 100 µm (i.e., "flexible disc"). However, the disc may be constructed to any total thickness including a range from about 100 µm to about 1.2 mm including, for example, discs having a total thickness of 100 µm, 400 µm, 600 µm, or 1200 µm, and the like.

The substrate layers 44, 50 may comprise a moldable non-photopolymer plastic substrate. Particular examples of suitable polymers for use in the polymer matrix for the substrate layers 44, 50 include, but are not limited to, poly(alkyl methacrylates), such as poly(methyl methacrylate) (PMMA), polyvinyl alcohols, poly(alkyl acrylates), polystyrenes, polycarbonates, poly(vinylidene chloride), poly(vinyl acetate), combinations thereof, and the like. The substrate layer 50 may further include a servo layer 46 therein that comprises grooves, or groove layer and a dichroic layer on the groove layer.

Examples of suitable substrate layers 44, 50, servo layer 46, groove layer, dichroic layer are discussed in the following references, but are not limited to, those materials listed in commonly assigned US Patent Pub. No. 2011/0080823, Ser. No. 12/966,144, entitled "Disc Structure For Bit-Wise Holographic Storage"; and, U.S. Pat. No. 8,194,520, Ser. No. 12/346,378, entitled "Disc Structure For Bit-Wise Holographic Storage". Both documents are hereby incorporated by reference in their entirety.

Figure 11:
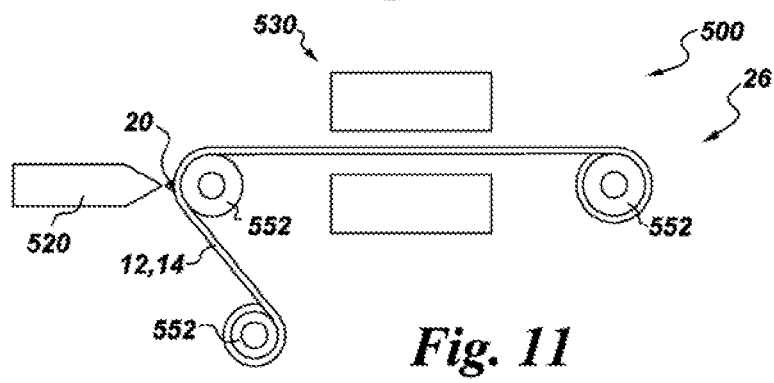
FIG. 11 is a schematic diagram of a system that employs a method of manufacture of a component, according to an embodiment of the present invention.
Figure 12:
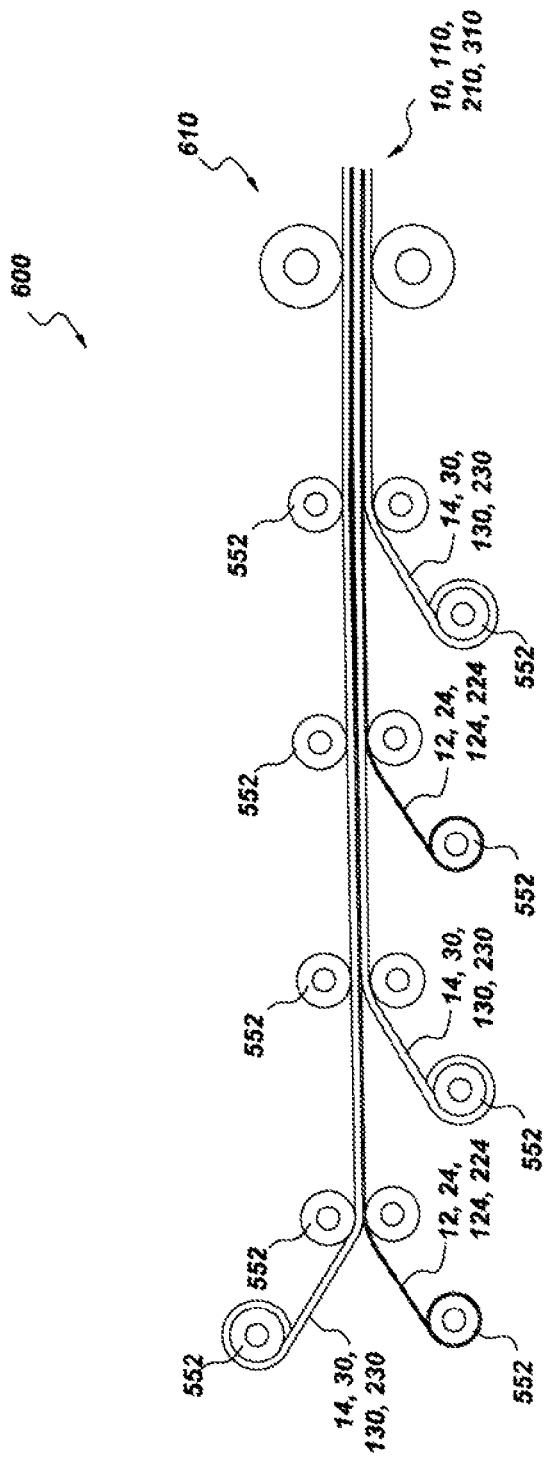
FIG. 12 is a schematic diagram of a system that employs a method of manufacture of a component, according to an embodiment of the present invention.
Figure 13:
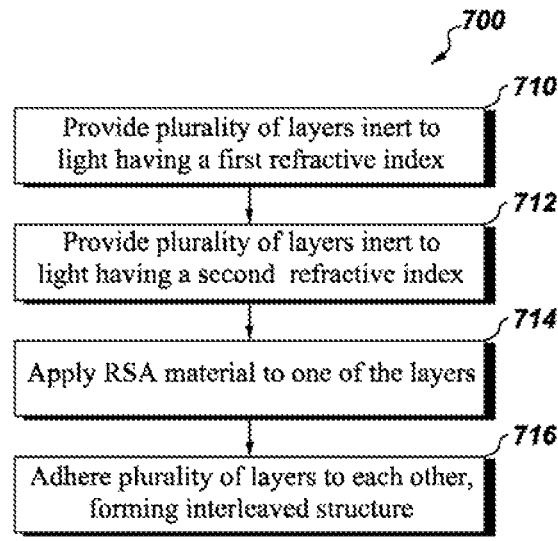
FIG. 13 is a flowchart depicting a method of manufacture of a component, according to an embodiment of the present invention.
Figure 14:
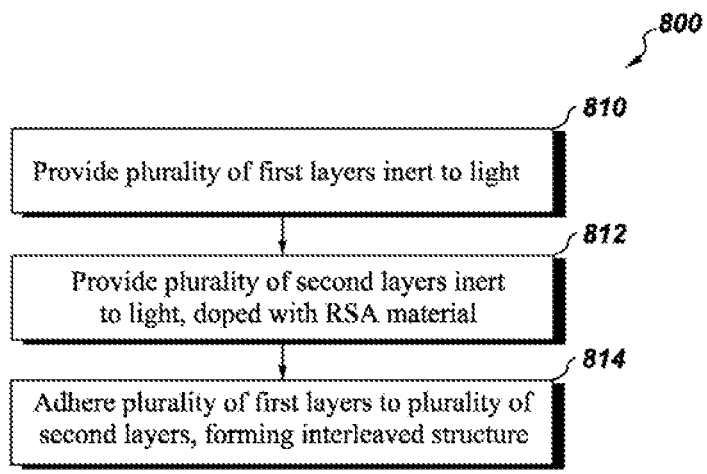
FIG. 14 is a flowchart depicting a method of manufacture of a component, according to another embodiment of the present invention.

Referring now to FIGS. 11 and 12, schematic diagrams of various systems that employ methods of manufacture of a data storage device component 10, 110, 210, 310, according to embodiment of the present invention are shown. Additionally, FIGS. 13 and 14 depict flowcharts depicting methods of manufacture of a component that the two systems in FIGS. 11 and 12 may employ. FIGS. 11 and 12 show portions of systems 500, 600, respectively. The systems 500, 600 may employ a plurality of rollers 552 and other known elements (not shown) and an adhering device 610 to construct at least the layer 12, 14, 24, 30, 124, 130, 224, 230 portion of a data storage device component 10, 110, 210, 310 as discussed.

Any suitable adhering device 610 may be used including a thermal press, a hot roll lamination device 610 (see e.g., FIG. 12), an optical curing agent, and the like.

This method may include the use of layer multiplication coextrusion techniques that can achieve hundreds to thousands of layers. This process generally comprises the coextrusion of two separate polymers that pass through a series of dies that split the stream vertically and spread it horizontally going into the next die. Thus, the initial 2 layer multiplies into $2^{n+1}$ layers to a maximum of 2048 layers with individual layers <10 nm thick [See reference: Y. Jin, H. Tai, A. Hiltner, E. Baer, James S. Shirk, Journal of Applied Polymer Science, Vol. 103, 1834-1841 (2007).] This technique has been used to make an all polymer melt-processed distributed Bragg reflector laser with layer thicknesses and spacing similar to those required in aspects of the present invention. [See reference: Kenneth D. Singer, Tomasz Kazmierczak, Joseph Lott, Hyunmin Song, Yeheng Wu, James Andrews, Eric Baer, Anne Hiltner, and Christoph Weder, OPTICS EXPRESS 2008, Vol. 16, No. 14, 10360]. Thus, the component, 10, 110, 210, 310 (e.g., layers 12, 14) could be made in a single pass (e.g., making a plurality of layers 12, 14, 24, 30, 124, 130, 224, 230) and adhered to other layers at the end of the process to produce a data storage device 100 that comprises layers 12, 14 which could be stacked separately to make the data storage device 100. In other embodiments, multiplication coextrusion techniques have also included 3-layer coextrusion so the entire stack 10, 110, 210, 310 could potentially be made in a single pass and used to later make the data storage device 100.

A method, as shown in FIG. 13 as 700, may comprise providing a plurality of layers inert to light having a first refractive index at 710. Similarly, a plurality of layers inert to light having a second refractive index, different than the first, is at 712. At 714, the RSA material is applied to at least one of the layers inert to light. Then at 716, the plurality of layers of light having the first refractive index are adhered to the plurality of layers of lights having the second refractive index, at least one of which layers having the RSA material applied thereon, thereby forming an interleaved component 10, 110, 210, 310.

A flowchart depicting another method of manufacture of the component 110, 210, 310 that the system in FIG. 12 may use is shown in FIG. 14 as 800. The system 600 may employ a roll-to-roll system that includes rollers 552 and a plurality of other elements (not shown) that are suitable so as to provide a component 110, 210, 310.

The method 800 comprises at 810 providing a plurality of first layers inert to light. At 812 a plurality of second layers inert to light further doped with RSA material, are provided. At 814, the plurality of first layers and the plurality of second layers (with RSA) are adhered to each other, thereby forming an interleaved structure.

In other embodiments, the component 10, 110, 210, 310 and/or data storage device 110 thereof may also be processed through a variety and combination of film roller drum(s) and/or thermal press(es), so as to form a sheet. Additionally, in an embodiment the plurality of layers 12, 14 and the plurality of other components are transported and aligned, via the roll-to-roll systems 600 shown in FIG. 12. The adhering may be provided by the adhering device 530, 610 or similar.

Other aspects in the method may include, but are not limited to, further adhering the component 10, 110, 210, 310 to one or more substrate layers, wherein the substrate layer comprises a non-photopolymer plastic substrate and a servo layer therein, thereby defining a data storage device. The device may further be cut to a predefined size and shape, so as to define a suitable data storage disc. Additional coating(s)

may be applied to one or both surfaces of the disc including a barrier coating, an anti-reflection coating, and an anti-scratch coating. The barrier coating typically is applied to both sides of the disc, while the anti-reflection coating, and the anti-scratch coating are merely applied to one side (the read/write side) of the disc.

In another embodiment, these plurality of components 10, 110, 210, 310 may be transported and aligned, via similar means (e.g., roll-to-roll systems) as those discussed with regards to the systems and methods depicted in FIGS. 11-14. The aligned plurality of unit hologram and spacer film structures, or components, may be adhered to each other thereby forming a component. Other film process steps in the method may include surface cleaning, treatment before coating, adding/removing protective masking films, and the like.

The coating device 520 may be any suitable device for applying any suitable RSA material 20 including, but not limited to, a slot-die coating, a slide coating, curtain coating, gravure coating, and the like. Similarly, the curing provided by the curing device 530 may be by any suitable means including, but not limited to, heating, ultraviolet curing, and the like. As with the other data storage devices constructed, other steps in the method may include, for example, adhering the stacked film structure to one or more substrate layers, cutting the device to a predefined size and shape, and/or applying various coatings as discussed herein.

Further, while embodiments illustrated and described herein may be used in the area of optical data storage and retrieval, aspects of the invention are not limited as such. The components, devices incorporating said components, and methods of manufacture may be used in other technical areas and for other technical endeavors including, but not limited, other non-linear optical uses such as reprogrammable Bragg reflectors.

Therefore, according to one embodiment of the present invention, a component comprises a stacked film structure comprising a plurality of layers inert to light having a first refractive index interleaved with a plurality of layers inert to light having a second refractive index, wherein in the first refractive index is different than the second refractive index; and a plurality of layers comprising a reverse saturable absorber (RSA) material, wherein each of the plurality of layers is located between one of the plurality of layers inert to light having the first refractive index and one of the plurality of layers inert to light having the second refractive index.

In accordance with another aspect of the invention, a method of manufacture comprises method of manufacture comprises: providing a plurality of layers inert to light having a first refractive index; providing a plurality of layers inert to light having a second refractive index, wherein the first refractive index is different than the second refractive index; applying a reverse saturable absorber (RSA) material to at least one of the layer inert to light having the first refractive index and the layer inert to light having the second refractive index; and, adhering the plurality of layers inert to light having the first refractive index to the plurality of layers inert to light having the second refractive index, so that the plurality of layers inert to light having the first refractive index and the plurality of layers inert to light having the second refractive index are interleaved, thereby forming a component having the RSA material located between the layer inert to light having the first refractive index and the layer inert to light having the second refractive index.

According to another embodiment of the present invention, a component comprises: a stacked film structure comprising a plurality of first layers inert to light interleaved with a plurality of second layers inert to light, further wherein the plurality of second layers are doped with a reverse saturable absorber (RSA) material.

According to another embodiment of the present invention, a method of manufacture comprises: providing a plurality of layers inert to light having a first refractive index; providing a plurality of layers inert to light having a second refractive index, said plurality of layers having the second refractive index further including a reverse saturable absorber (RSA) material doped therein; and, adhering the plurality of layers inert to light having the first refractive index to the plurality of layers inert to light having the second refractive index, so that the plurality of layers inert to light having the first refractive index and the plurality of layers inert to light having the second refractive index are interleaved, thereby forming a stacked component having the doped RSA material-laden layers located between the layer inert to light having the first refractive index.

While only certain features of the invention have been illustrated and/or described herein, many modifications and changes will occur to those skilled in the art. Although individual embodiments are discussed, the present invention covers all combination of all of those embodiments. It is understood that the appended claims are intended to cover all such modification and changes as fall within the intent of the invention.

What is claimed is:

1. A device, comprising:
   a first layer substantially inert to light, wherein the first layer comprises a first refractive index;
   a second layer substantially inert to light and disposed on the first layer, wherein the second layer comprises a second refractive index; and
   a third layer disposed on the second layer, wherein the third layer comprises a reverse saturable absorber (RSA) material.

2. The device of claim 1, comprising a fourth layer substantially inert to light and disposed on the third layer, wherein the fourth layer comprises the first refractive index.

3. The device of claim 2, comprising a fifth layer substantially inert to light and disposed on the fourth layer, wherein the fifth layer comprises the second refractive index.

4. The device of claim 3, comprising a sixth layer disposed on the fifth layer, wherein the sixth layer comprises the RSA material.

5. The device of claim 1, wherein the third layer comprises a modified portion, and wherein the modified portion is configured to reflect scattered light as an indication that data is not stored at the modified portion of the third layer.

6. The device of claim 1, wherein the third layer comprises a non-modified portion, and wherein the non-modified portion is configured to reflect substantially parallel light as an indication that data is stored at the non-modified portion of the third layer.

7. The device of claim 1, wherein the RSA material comprises a metal phthalocyanine, a subphthalocyanine, a porphyrin, a platinum ethynyl based dye, or a combination thereof.

8. The device of claim 1, wherein the first refractive index is not equal to the second refractive index.

9. The device of claim 1, comprising:
   a first plurality of layers including the first refractive index and a second plurality of layers including the second refractive index; and
   a third plurality of layers comprising the RSA material, wherein each of the third plurality of layers is interposed between a respective one of the first plurality of layers and a respective one of the second plurality of layers.

10. The device of claim 1, wherein the first layer comprises a thickness substantially equal to a thickness of the second layer.

11. An optical storage device, comprising:
a substrate; and
a stack disposed on the substrate, wherein the stack comprises:
a first layer substantially inert to light, wherein the first layer comprises a first refractive index;
a second layer substantially inert to light and disposed on the first layer, wherein the second layer comprises a second refractive index; and
a third layer interposed between the first layer and the second layer, wherein the third layer comprises a reverse saturable absorber (RSA) material.

12. The optical storage device of claim 11, wherein the first layer comprises a poly(alkyl methacrylate), a poly(methyl methacrylate) (PMMA), a polyvinyl alcohol, a poly(alkyl acrylate), a polystyrene, a polycarbonate, a poly(vinylidene chloride), a poly(vinylacetate), a poly(vinylidene fluoride-co-trifluoroethylene), a poly(vinylpyrrolidone), a styrene-acrylonitrile, or any combination thereof.

13. The optical storage device of claim 11, wherein the second layer comprises a poly(alkyl methacrylate), a poly(methyl methacrylate) (PMMA), a polyvinyl alcohol, a poly(alkyl acrylate), a polystyrene, a polycarbonate, a poly(vinylidene chloride), a poly(vinylacetate), a poly(vinylidene fluoride-co-trifluoroethylene), a poly(vinylpyrrolidone), a styrene-acrylonitrile, or any combination thereof.

14. The optical storage device of claim 11, wherein the substrate comprises a coating disposed on at least one of a front surface and a back surface of the substrate.

15. The optical storage device of claim 14, wherein the coating comprises a barrier coating, an anti-reflection coating, an anti-scratch coating, or a combination thereof.

16. The optical storage device of claim 11, wherein each of the first layer and the second layer comprises a thickness between approximately 20 nanometers (nm) and approximately 500 nm.

17. The optical storage device of claim 11, wherein each of the RSA layer comprises a thickness of less than approximately 5 nanometers (nm).

18. The optical storage device of claim 11, wherein the substrate comprises a moldable non-photopolymer plastic substrate.

19. A method of forming an optical data storage medium, comprising:
disposing a first layer comprising a first refractive index over a substrate, wherein the first layer is substantially nonreactive to light;
disposing a second layer comprising a second refractive index over the first layer, wherein the second layer is substantially nonreactive to light; and
interposing a reverse saturable absorber (RSA) layer between the first layer and the second layer.

20. The method of claim 19, wherein disposing the second layer over the first layer comprises adhering the second layer to the first layer.

21. The method of claim 19, wherein interposing the RSA layer between the first layer and the second layer comprises doping at least a portion of the second layer with an RSA material.

22. The method of claim 19, comprising forming a modified portion of the RSA layer, wherein the modified portion is configured to reflect scattered light as an indication of whether data is stored on the optical data storage medium.

23. The method of claim 19, comprising disposing a coating on a surface of the substrate.

24. A method for reading data from a data disk, comprising:
impinging a reading beam on the data disk, wherein the data disk comprises a first layer including a first refractive index and a second layer including a second refractive index, and wherein the second layer comprises a reverse saturable absorber (RSA) material; and
detecting light reflected from the second layer, wherein detecting the light comprises detecting whether data is stored on the data disk.

25. The method of claim 24, wherein detecting whether data is stored on the data disk comprises detecting whether the light reflected from the second layer comprises a substantially scattered orientation or a substantially parallel orientation.

26. The method of claim 25, wherein the data is stored on the data disk when the light reflected from the second layer comprises the substantially parallel orientation.

27. The method of claim 25, wherein the data is not stored on the data disk when the light reflected from the second layer comprises the substantially scattered orientation.

28. The method of claim 24, comprising impinging a recording beam on the data disk to store data to the data disk.

* * * * *